United States Patent
Leslie

(10) Patent No.: US 9,694,981 B2
(45) Date of Patent: Jul. 4, 2017

(54) LOCKING BASE FOR CONTAINER GRIPPER BODY

(71) Applicant: John M. Leslie, Blountville, TN (US)

(72) Inventor: John M. Leslie, Blountville, TN (US)

( * ) Notice: Subject to any disclaimer, the term of this patent is extended or adjusted under 35 U.S.C. 154(b) by 0 days.

(21) Appl. No.: 14/756,767

(22) Filed: Oct. 9, 2015

(65) Prior Publication Data
US 2017/0101267 A1  Apr. 13, 2017

(51) Int. Cl.
| | |
|---|---|
| B65G 17/32 | (2006.01) |
| B65G 17/44 | (2006.01) |
| B65G 37/00 | (2006.01) |
| B65G 15/14 | (2006.01) |

(52) U.S. Cl.
CPC ........... B65G 17/323 (2013.01); B65G 15/14 (2013.01); B65G 17/44 (2013.01); B65G 37/005 (2013.01)

(58) Field of Classification Search
CPC ...... B65G 17/26; B65G 17/323; B65G 17/44; B65G 15/14; B65G 37/005
See application file for complete search history.

(56) References Cited

U.S. PATENT DOCUMENTS

| | | | | |
|---|---|---|---|---|
| 4,798,281 A | * | 1/1989 | Egger | B65G 15/14 198/626.5 |
| 5,090,557 A | * | 2/1992 | Carmen | B65G 15/14 198/626.1 |
| 5,219,065 A | * | 6/1993 | Hodlewsky | B65G 17/086 198/626.6 |
| 5,429,226 A | * | 7/1995 | Ensch | B65G 17/44 198/803.14 |
| 6,176,370 B1 | * | 1/2001 | Davies | B26D 7/018 198/803.2 |
| 6,772,876 B2 | * | 8/2004 | Spangenberg | B65G 37/005 198/867.02 |
| 6,851,549 B1 | * | 2/2005 | Beringer | B65G 17/44 198/803.14 |
| 2013/0277176 A1 | * | 10/2013 | Corlett | B65G 17/44 198/626.1 |

* cited by examiner

*Primary Examiner* — Gene Crawford
*Assistant Examiner* — Keith R Campbell

(57) ABSTRACT

A container gripping device for use on machines which are used for filling, capping, sterilizing, or the like containers, particularly fluid containers such as plastic bottles, wherein the device has a base adapted for attachment to a conveyor like chain, and has a container gripping body mounted on the base, and wherein the base and body have cooperating elements of a quick release locking structure for stabilizing the mounting and configuration of lengthy gripper bodies on gripper bases.

2 Claims, 3 Drawing Sheets

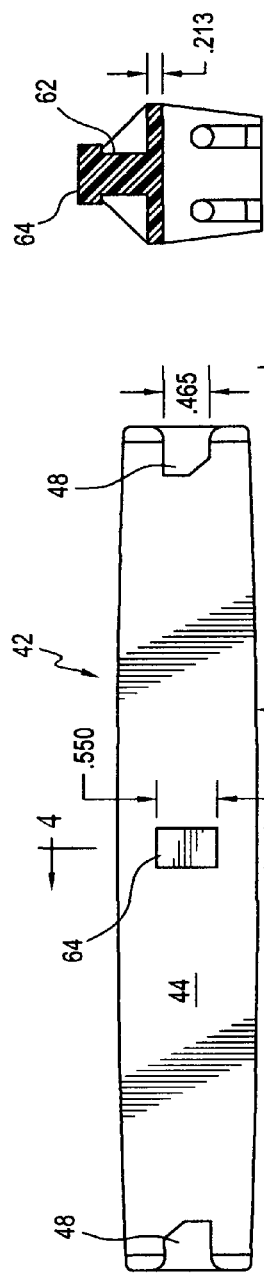
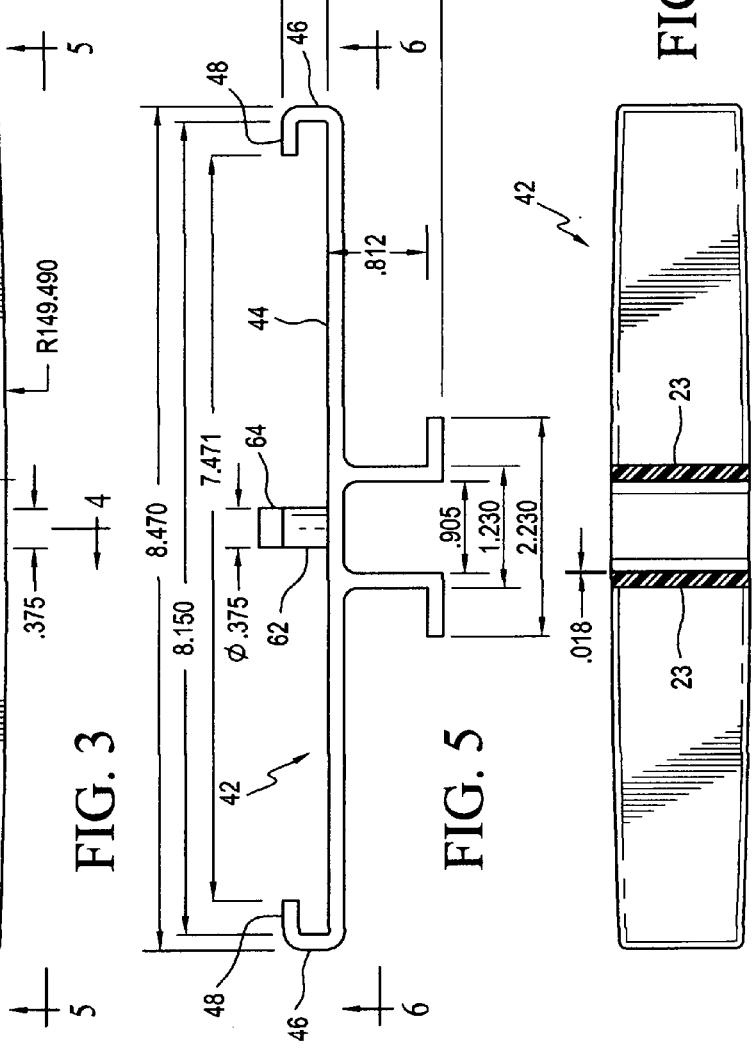
FIG. 3
FIG. 4
FIG. 5
FIG. 6

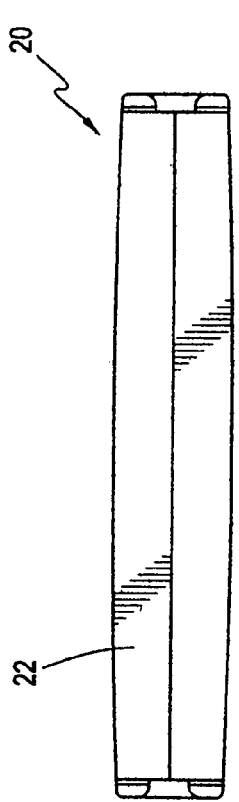
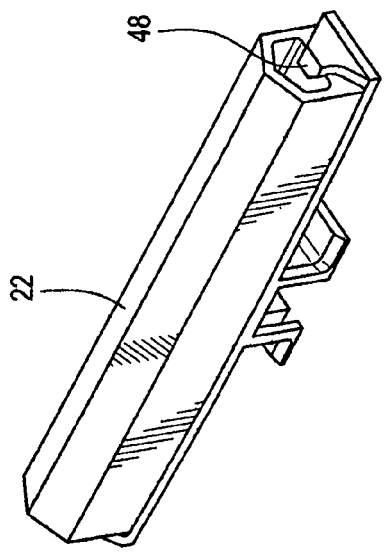
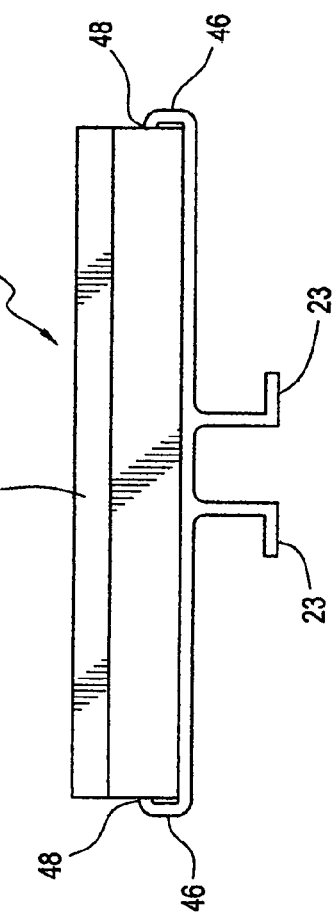
FIG. 10
FIG. 12
FIG. 11

LOCKING BASE FOR CONTAINER GRIPPER BODY

FIELD

This invention is directed to a unique and improved product gripper structure for use on a product capturing or clamping conveyor chain which is typically made up of roller base chain links provided with a snap-on product gripping device having a gripper body and a base (support) plate usually connected to each link and comprising a metal or plastic base plate for quick attachment to the link, wherein the base plate has the product gripping body of resilient material such as rubber, polyurethane, polylefin, polyester, polyamides, or the like elastomers fixed onto the top surface of the base plate. Two such chains typically run on edge and parallel to each other. The products such as liquid containers are picked up in their path by squeezing them between the opposing gripping members as the chains are made to converge. The chains are able to flex within a plane substantially coextensive with the longitudinal axes of the grippers in order to raise or lower the product being conveyed, and then the two chains separate, thereby setting the products on a conveyor or platform at a different level. See U.S. Pat. Nos. 5,219,065, and 6,851,549, the disclosures of both hereby being incorporated herein by reference in their entireties, for the general layout of product capturing chain constructions which could be used commercially with the present gripper.

Prior base plate structures have encountered stability problems associated with gripper bodies which are used for larger and more lengthy gripper bodies which tend to bend and twist when gripping, e.g., larger and heavier container products. Such deformation can put the container in an incorrect position relative to stations on container processing machines such as, e.g., filling or capping operations or transfer to other sections of the machine.

The present product gripper structure alleviates these problems through a quick release locking structure preferably located at the longitudinal middle portion of the gripper base and gripper body and provides greatly enhanced structural stability and longevity to the present gripper structure, particularly where the gripper body is elongated.

SUMMARY OF THE PRESENT INVENTION

A container gripper structure of molded polymeric material for use on a container carrying conveyor, the gripper structure having a molded base and a molded product gripping body, wherein cooperating elements of a quick disconnect coupling structure are provided on contiguous, generally mid-section portions of the base and the gripping body whereby a greatly enhanced connection strength of said base and body is afforded.

BRIEF DESCRIPTION OF THE DRAWINGS

Referring to the drawings herein wherein the figures are not necessarily drawn to scale or consistent proportions and wherein exemplary dimensions are given in inches, and wherein dimensions shown of the structures are examples only and do not limit the claims, and wherein:

FIG. 3 is a top view of the gripper base of typical dimensions;
FIG. 4 is a cross-sectional view taken along line 4-4 in FIG. 3;
FIG. 5 is a side view taken along line 5-5 in FIG. 3;
FIG. 6 is a view taken along line 6-6 in FIG. 5;
FIG. 10 is a top down view of the present assembly of gripper body and carrier base;
FIG. 11 is a side view of FIG. 10;
and
FIG. 12 is an isometric view of FIG. 11.

Figure 1:
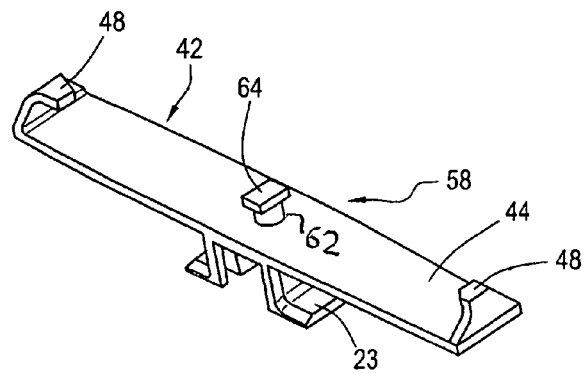
FIG. 1 is an isometric view of the present gripper base.
Figure 2A:
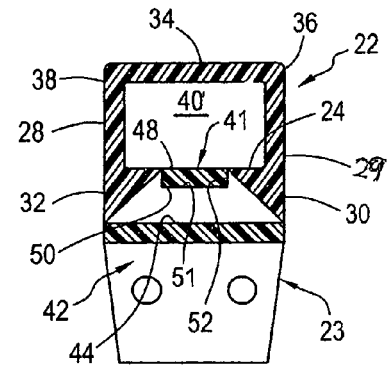
FIG. 2A is an enlarged cross-sectional view taken along line 2A-2A in FIG. 2.
Figure 2:
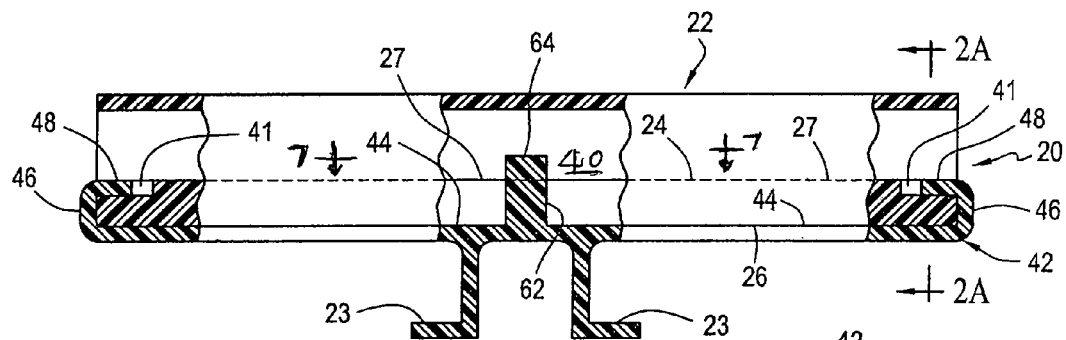
FIG. 2 is a side view of the gripper base of FIG. 1 as interlocked to an elastomeric gripper body with portions of the body side wall broken away for clarity.
Figure 7:
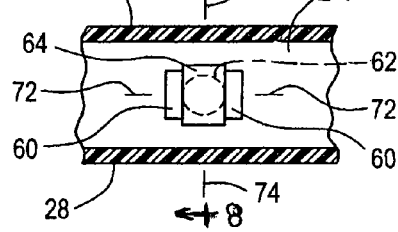
FIG. 7 is a view taken along line 7-7 in FIG. 2 of present locking means in operating locked position.

Referring to the drawings and to the claims herein, the present invention in preferred embodiments comprises a product gripper construction generally designated 20 having an elongated gripper body 22 of elastomeric material and having chain mounting structure 23, a body floor 24 with a substantially planar bottom surface 26 and upper surface 27, substantially parallel laterally spaced side walls 28 and 29 upstanding from longitudinally extending edge portions 30, 32 respectively of said floor, and a product engaging ceiling cap portion 34 extending to and between outer upper edge portions 36, 38 of said side walls to provide an open ended, longitudinally extending cavity 40. The gripper body 22, particularly cap 34 can have any configuration which may be required for gripping a particularly configured container.

The gripper construction further comprises a semi flexible elongated gripper base 42 having a substantially planar upper platform surface 44 for engaging and supporting body 22 and chain mounting bracket portions 23.

A hook member 46 integral with each end of base 42 has a tab portion 48 inserted into an end portion of cavity 40 and engaging in a recess 41 having shoulder portions 50, 51, 52 formed in floor 24 for engaging said tab portions and fixing the position of the body end portion on the base.

Figure 9:
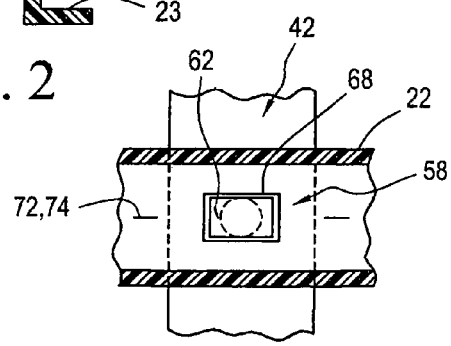
FIG. 9 is a view as in FIG. 7 wherein the axes of the carrier base and gripper body are at 90° to each other to allow insertion of the lock head of the gripper base through the assembly slot in the body floor.
Figure 8:
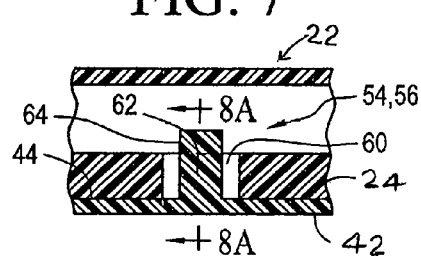
FIG. 8 is an enlarged cross-sectional view of the lock area in locked position taken along line 8-8 in FIG. 7.
Figure 8A:
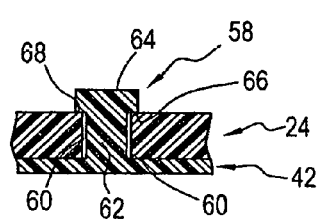
FIG. 8A is a cross-sectional view taken along line 8A-8A in FIG. 8.

Cooperating elements 54 and 56 of quick release locking means are provided on longitudinally central portions 58 of floor 24 and base 42 for preventing any significant lateral and vertical relative movement between said body and said base. The elements 54 and 56 in a preferred embodiment of the present invention comprise a generally rectangular aperture 60 through floor 24 and a post member 62, preferably round in lateral cross-section, protruding upwardly from said platform surface 44 and provided with a locking head 64 on an upper end of said post member 62. Each said aperture and head have a major dimension or axis 72 and 74 respectively, wherein the dimensions and configuration of said aperture, and the dimension and configuration of said post and head allow said post and head to be inserted through said aperture when said major dimensions (axes) are in substantial alignment as shown in FIG. 9, and wherein underneath surface portions 66 of said head slide over upper surface portions 68 of floor 24 adjacent to said aperture when said major dimensions are moved out of alignment as shown in FIG. 8A. The term "dimension" as used herein refers to horizontal surfaces as viewed in the drawings, i.e., horizontal length and width. Preferably, said aperture and said head each have a rectangular configuration and wherein the horizontal dimensions of said aperture are from about 0.001 in. to about 0.1 in., greater than the dimensions of said head.

The invention has been described in detail with particular reference to preferred embodiments thereof, but it will be understood that variations and modifications will be effected within the spirit and scope of the invention.

I claim:

1. A product gripper construction comprising an elongated gripper body of elastomeric material having a longitudinal axis and a lateral axis, opposite end portions, planar floor, substantially parallel laterally spaced side walls upstanding from longitudinally extending edge portions of said floor, and a product engaging ceiling cap extending to and between outer upper edge portions of said side walls to provide an open ended, longitudinally extending cavity,
   a semi flexible elongated gripper base having a substantially planar upper platform surface engaging said floor and supporting said body,
   a hook member integral with each end of said base, each said hook member having a tab portion inserted into an end portion of said cavity and engaging upper surface portions of said floor for fixing the position of said end portions of said body on said base, and
   cooperating elements of quick release locking structure on longitudinally central portions of said floor and said base for preventing movement between said body and said base, wherein said elements comprise a generally rectangular aperture in said floor and a post member having a vertical axis and protruding upwardly from said platform surface,
   wherein a locking head is provided on an upper end of said post member,
   wherein each of said aperture and head have a major longitudinal dimension and a minor lateral dimension, wherein the dimensions and configuration of said aperture, and the dimension and configuration of said post and head allow said post and head to be inserted through said aperture when said major dimensions are in substantial alignment, and wherein underneath surface portions of said head slide over upper surface portions of said floor adjacent to said aperture when said major dimensions are rotated out of alignment.

2. The product gripper construction of claim 1 wherein said aperture and said head each have a rectangular configuration and wherein the longitudinal and lateral dimensions of said aperture are from about 0.001 in. to about 0.1 in., greater than the longitudinal and lateral dimensions of said head.

\* \* \* \* \*